US007797694B2

(12) United States Patent
Sonbarse et al.

(10) Patent No.: US 7,797,694 B2
(45) Date of Patent: Sep. 14, 2010

(54) MECHANISM TO UPGRADE SYSTEM CAPABILITY WITHOUT AFFECTING SERVICE

(75) Inventors: Santosh K. Sonbarse, Eden Prairie, MN (US); John M. Hedin, Coon Rapids, MN (US); Jeffrey J. Cannon, St. Louis Park, MN (US); Paul Schatz, Burnsville, MN (US); Michael Kremer, Shakopee, MN (US); William J. Mitchell, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1395 days.

(21) Appl. No.: 11/229,893

(22) Filed: Sep. 19, 2005

(65) Prior Publication Data

US 2007/0067763 A1 Mar. 22, 2007

(51) Int. Cl.
*G06F 9/44* (2006.01)
(52) U.S. Cl. .................................................... 717/168
(58) Field of Classification Search .................. None
See application file for complete search history.

(56) References Cited

U.S. PATENT DOCUMENTS

| 4,183,054 A | 1/1980 | Patisaul et al. |
| 4,577,273 A | 3/1986 | Hopper et al. |
| 4,611,323 A | 9/1986 | Hessenmuller |
| 4,625,081 A * | 11/1986 | Lotito et al. ............. 379/88.26 |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |
| 5,887,183 A * | 3/1999 | Agarwal et al. ................ 712/2 |
| 6,141,683 A * | 10/2000 | Kraml et al. ................ 709/220 |

(Continued)

FOREIGN PATENT DOCUMENTS

EP 0391597 10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner*—Wei Y Zhen
*Assistant Examiner*—Lanny Ung
(74) *Attorney, Agent, or Firm*—Fogg & Powers LLC

(57) ABSTRACT

A method of upgrading the system capability of a communications network is provided. The method involves initiating a transfer of at least one set of upgraded system capability software machine-coded instructions to a host card, instructing the host card to begin an upgrade process, determining whether at least one set of system capability software machine-coded instructions on the host card is valid, and completing the transfer of at least one valid set of system capability software machine-coded instructions to the host card, wherein the system capability is upgraded without affecting operation of the network.

29 Claims, 3 Drawing Sheets

U.S. PATENT DOCUMENTS

| | | |
|---|---|---|
| 6,467,009 B1 | 10/2002 | Winegarden et al. |
| 2001/0032249 A1 | 10/2001 | Worch |
| 2004/0044997 A1 | 3/2004 | Talati et al. |
| 2004/0092255 A1 | 5/2004 | Ji et al. |
| 2004/0103340 A1 | 5/2004 | Sundareson et al. |
| 2005/0055689 A1* | 3/2005 | Abfalter et al. ............ 717/174 |
| 2005/0076333 A1* | 4/2005 | Leclair et al. ............... 717/176 |
| 2006/0253617 A1 | 11/2006 | Lin et al. |

FOREIGN PATENT DOCUMENTS

| | | |
|---|---|---|
| WO | 9115927 | 10/1991 |
| WO | 02057915 | 7/2002 |

OTHER PUBLICATIONS

Harvey et al., "Cordless Communications Utilising Radio Over Fibre Techniques for the Local Loop", "IEEE International Conference on Communications", , pp. 1171-1175, Publisher: IEEE.

Harvey et al., "Cordless Communications Utilising Radio Over Fibre Techniques for the Local Loop", "International Conference on Communications", Jun. 1991, pp. 1171-1175, Publisher: IEEE.

* cited by examiner

MECHANISM TO UPGRADE SYSTEM CAPABILITY WITHOUT AFFECTING SERVICE

TECHNICAL FIELD

The present invention relates generally to the field of telecommunications, and in particular, the upgrading of system capabilities in a communications network.

BACKGROUND

As wireless communications networks evolve and gain acceptance by an ever-growing spectrum of end users, the need to keep the system functional remains critical. Advances in transport technology, particularly digital radio frequency (RF), provide the additional performance and improved signal quality demanded by the consumer. The traditional wireless network architecture, which relies on equipment upgrades in order to overcome limitations, is being transformed by technologies such as software-defined radio (SDR). With SDR, a radio signal is generated using software rather than traditional radio equipment hardware, and wireless service providers have greater flexibility by programming SDR to provide a broader range of frequencies, bandwidths, and transmission protocols.

With the increase in capability provided by SDR being deployed on digital wideband RF transport systems, new data and video services are being adopted at an ever-increasing rate. As is the case in upgrading a traditional RF network, service is interrupted on digital wideband RF transport systems in order to upgrade the system with new capabilities. Whenever a system upgrade is attempted, there is a risk that a software download to the system is unsuccessful due to an unanticipated interruption of power. Upgrading a system while operating is the ideal situation, yet accomplishing a system upgrade without affecting the normal operation of the network continues to expose vulnerabilities in continuity of service.

The risk that the software upgrade is unsuccessful due to an unanticipated interruption of power can cause a network to discontinue functioning if the interruption occurs at an inopportune time by corrupting the computing logic in one or more transport units. In these situations, service personnel will have to be sent on-site to complete the upgrade, and possibly replace system hardware. Without knowing whether the software loaded in the transport unit is valid, the system will attempt to function using impaired logic, leading to potential downtime throughout the network.

For the reasons stated above and for other reasons stated below which will become apparent to those skilled in the art upon reading and understanding the specification, there is a need in the art for an improved system upgrade mechanism that is transparent to the operation of a communications network.

SUMMARY

In one embodiment, a method of upgrading the system capability of a communications network is provided. The method involves initiating a transfer of at least one set of upgraded system capability software machine-coded instructions to a host card, instructing the host card to begin an upgrade process, determining whether at least one set of system capability software machine-coded instructions on the host card is valid, and completing the transfer of at least one valid set of system capability software machine-coded instructions to the host card, wherein the system capability is upgraded without affecting operation of the network.

In another embodiment, a system capability upgrade module is provided. The module includes an upgrade control processor, the processor adapted to receive instructions to begin a system capability upgrade process, a programmable logic device, at least one primary program memory storage medium adapted to receive one or more first sets of software machine-coded instructions for operating a system, at least one secondary program memory storage medium adapted to receive one or more second sets of software machine-coded instructions for operating the system, and a target processor, the processor adapted to receive the software machine-coded instructions for operating the system from either the at least one primary or the at least one secondary program memory storage medium, wherein the programmable logic device is further adapted to select the contents of either the at least one primary or the at least one secondary program memory storage medium for transfer to the target processor without user intervention.

In yet another embodiment, a communications system is provided. The system includes a host card, the host card adapted to include one or more system capability upgrade modules, a network card coupled to the one or more system capability upgrade modules over one or more transport mediums, and a remote card coupled to the one or more system capability upgrade modules over one or more transport mediums, wherein the one or more system capability upgrade modules are instructed by either the network card or the remote card to upgrade system capability without affecting the service provided by the system.

DRAWINGS

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention address problems with communications networks and will be understood by reading and studying the following specification. Particularly, in one embodiment, a method of upgrading the system capability of a communications network is provided. The method involves initiating a transfer of at least one set of upgraded system capability software machine-coded instructions to a host card, instructing the host card to begin an upgrade process, determining whether at least one set of system capability software machine-coded instructions on the host card is valid, and completing the transfer of at least one valid set of system capability software machine-coded instructions to the host card, wherein the system capability is upgraded without affecting operation of the network.

Embodiments of the present invention may be implemented with present communication network technologies as well as current electronic circuit and computing technologies. This description is presented with enough detail to provide an understanding of the present invention, and should not be construed to encompass all necessary elements in a communications network. Within this description, the term "system capability upgrade" refers to any enhancement of an existing feature set of a digital wideband RF transport system that provides an end user of the system with new voice, data and/or video services.

Although the examples of embodiments in this specification are described in terms of the upgrading of capabilities in a communication network, embodiments of the present invention are not limited to upgrading of capabilities in a communication network. Embodiments of the present invention are applicable to any system capability upgrade activity that requires upgrading the contents of memory storage mediums without disrupting the service provided by the system. Alternate embodiments of the present invention utilize a mechanism for upgrading the capability of a communications system that determines whether a set of system capability upgrade instructions is valid without user intervention and allows the upgrade to occur while the system is operating within a minimum allowable time frame.

Figure 1:
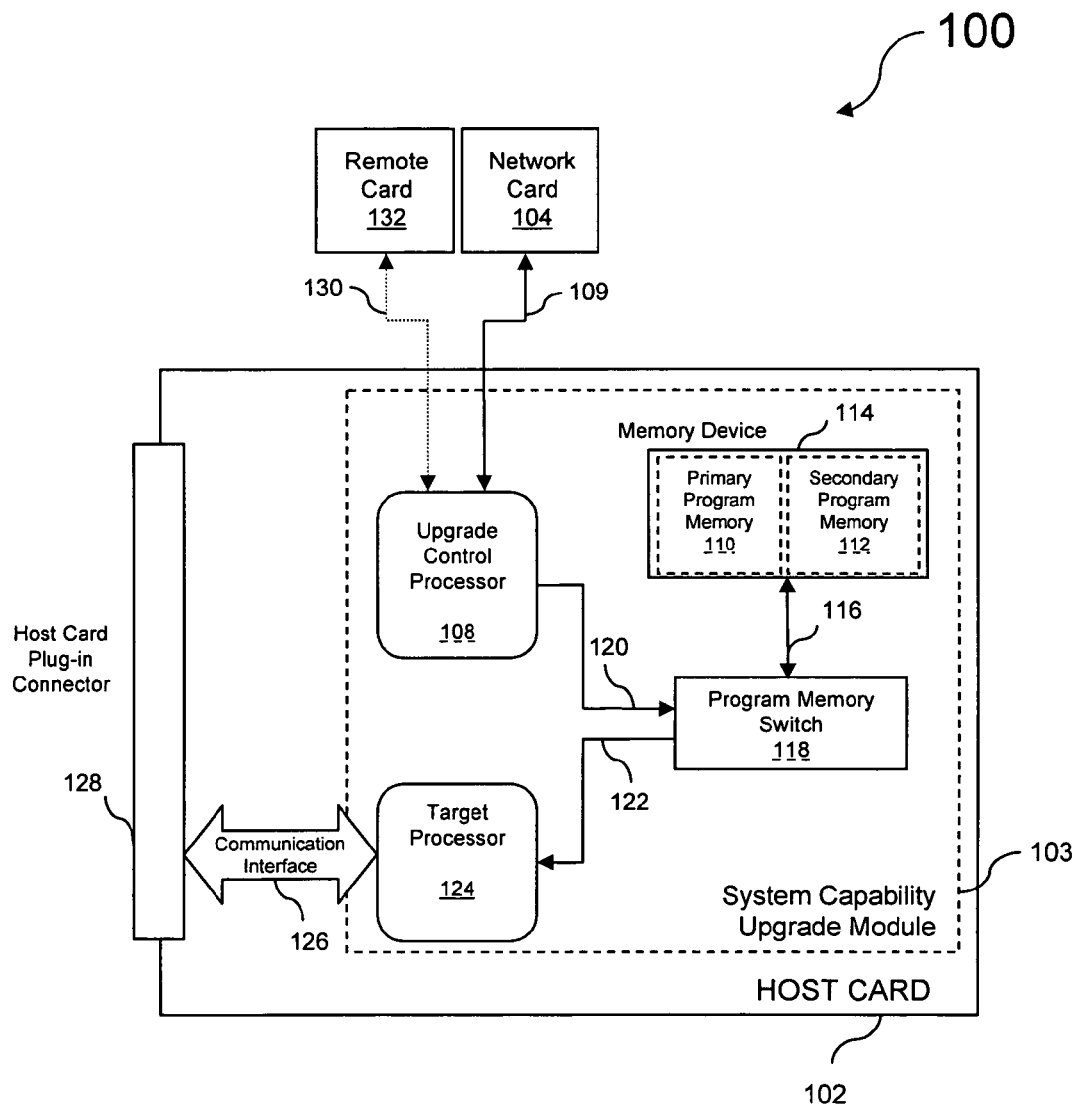
FIG. 1 is a block diagram of one embodiment of a communications system incorporating a mechanism to upgrade system capability in accordance with the present invention.

Referring to the drawings, FIG. 1 is a block diagram of an embodiment of a communications system, indicated generally at 100, incorporating a mechanism to upgrade system capability according to the teachings of the present invention. System 100 comprises a host card 102, a system capability upgrade module 103, a network card 104, and a remote card 132. System capability upgrade module 103 includes a target processor 124, program memory switch 118, memory device 114, and upgrade control processor 108, each of which are discussed in turn below.

System capability upgrade module 103 resides on host card 102 and is coupled to a host card plug-in connector 128 by communication interface 126. In one embodiment, communication interface 126 is a Peripheral Component Interconnect (PCI)-X interface, an Advanced Telecommunications Computing Architecture (ATCA) interface, a PCI Express interface, a Gigabit Ethernet interface, a Small Computer System Interface (SCSI) interface, a Rocket I/O interface, a User Datagram Protocol/Internet Protocol (UDP/IP) link interface, a Transmission Control Protocol/Internet Protocol (TCP/IP) link interface, a Serial Advanced Technology Attachment (ATA) interface, a CardBus interface, a high speed serial interface, a high speed parallel interface, or the like that transports data bi-directionally between target processor 124 of system capability upgrade module 103 and host card plug-in connector 128.

Target processor 124 is coupled to program memory switch 118 by target program memory transfer interface 122. In one embodiment, target processor 124 is a microprocessor, a field programmable gate array (FPGA), or the like. In the same embodiment, program memory switch 118 is a programmable logic device, a complex programmable logic device (CPLD), an FPGA, or the like, used to load one or more "sets of appropriate system capability software machine-coded instructions", herein referred to as "system software", for target processor 124 from memory device 114. Program memory switch 118 is coupled to memory device 114 by memory transfer interface 116. It is noted that for simplicity in description, a single memory device 114 is shown in FIG. 1. However, it is understood that system capability upgrade module 103 supports any appropriate number of memory devices 114, e.g., 2 or more memory devices, in a single system capability upgrade module 103. In one embodiment, memory device 114 is a flash memory device, a read only memory (ROM) device, an electrically erasable programmable read only memory (EEPROM) device, a one time programmable (OTP) memory device, or any electrical, magnetic, or optical storage device containing at least two memory banks, primary program memory 110 and secondary program memory 112. In the same embodiment, memory transfer interface 116 is a bi-directional communication link used to transfer the system software chosen by program memory switch 118 from or to either primary program memory 110 or secondary program memory 112 of memory device 114.

Program memory switch 118 is coupled to upgrade controller processor 108 by upgrade instruction interface 120. In one embodiment, upgrade controller processor 108 is a microprocessor, an FPGA, or the like. In the same embodiment, upgrade instruction interface 120 is a direct communication link used to initiate a transfer of the system software stored in memory device 114. In one embodiment, both primary program memory 110 and secondary program memory 112 contain the same known good version of system software. In another embodiment, primary program memory 110 contains a current version of system software and secondary program memory 112 contains a core version of system software. Moreover, the core version of system software provides an essential set of system capability software machine-coded instructions that allow communications system 100 to continue operating until another system capability upgrade attempt is made. Once upgraded system software is received by update control processor 108, program memory switch 118 transfers the upgraded system software exclusively to primary program memory 110. Since primary program memory 110 is the only storage medium upgraded on a continual basis, secondary program memory 112 is guaranteed to always have a known good version of system software that can be used to operate communications system 100 if an upgrade attempt is not successful.

In another embodiment, secondary program memory 112 contains the prior version of system software operating in target processor 124. Moreover, the current version of system software is stored in primary program memory 110. Prior to any system upgrade of communications system 100, both primary program memory 110 and secondary program memory 112 contain the same version of system software, and each time primary program memory 110 is upgraded, the prior version of system software is transferred to secondary program memory 112. In yet another embodiment, for each occurrence of a system capability upgrade, program memory switch 118 is instructed to alternate the transfer of a new version of system software between primary program memory 110 and secondary program memory 112. Since each subsequent upgrade process will not affect all of the at least two memory banks of memory device 114 each time, the longevity of the at least two memory banks increases by at least a factor of two.

Upgrade control processor 108 is further coupled to network card 104 by network card interface 109. In one embodiment, network card interface 109 is a bi-directional communication link that uses twisted pair cable, optical fiber, coaxial cable, millimeter wave, Free Space Optics (FSO), or the like to transmit instructions from network card 104 to upgrade control processor 108 to initiate a system capability upgrade. Additionally, upgrade control processor 108 is communicatively coupled to remote card 132 by remote card interface 130. In one embodiment, remote card interface 130 is a bi-directional communication link that uses twisted pair cable, optical fiber, coaxial cable, millimeter wave, FSO, or the like to transmit instructions from remote card 132 to upgrade control processor 108 to initiate a system capability upgrade. The remote or host network connectivity provides the ability to initiate a system capability upgrade of a communications network from any location.

In operation, host card 102 is already functioning with the previously installed version of system software currently operating on target processor 124. Target processor 124 provides the instructions for operating communications system 100 via communication interface 126 when card plug in connector 128 is attached to a SDR server (not shown). Prior to system capability upgrade module 103 receiving a request to upgrade the system capability, upgrade control processor 108 receives upgraded system software from either network card 104 via network card interface 109 or remote card 132 via remote card interface 130. The upgraded system software is transferred from upgrade control processor 108 to program memory switch 118 via upgrade instruction interface 120. In turn, program memory switch 118 transfers the upgraded system software to primary program memory 110 of memory device 114 via memory transfer interface 116.

Once the upgraded system software is loaded into the primary program memory 110 of memory device 114, upgrade control processor 108 is instructed by either network card 104 or remote card 132, as described above, to reinitialize the host card 102 by performing a reset. In addition to the reset command issued by upgrade control processor 108, the system capability upgrade will also occur if power is cycled on host card 102, e.g. host card 102 is restarted, anytime after the upgraded system software has been transferred into memory device 114. Once the reset or restart occurs, the sequence of upgrading target processor 124 begins, and is further described with respect to FIG. 3 below. By separating the storing of upgraded system software from the actual upgrade operation, the upgrade is performed at any time without interrupting the operation of communications system 100 for the entire length of the upgrade process.

Figure 2:
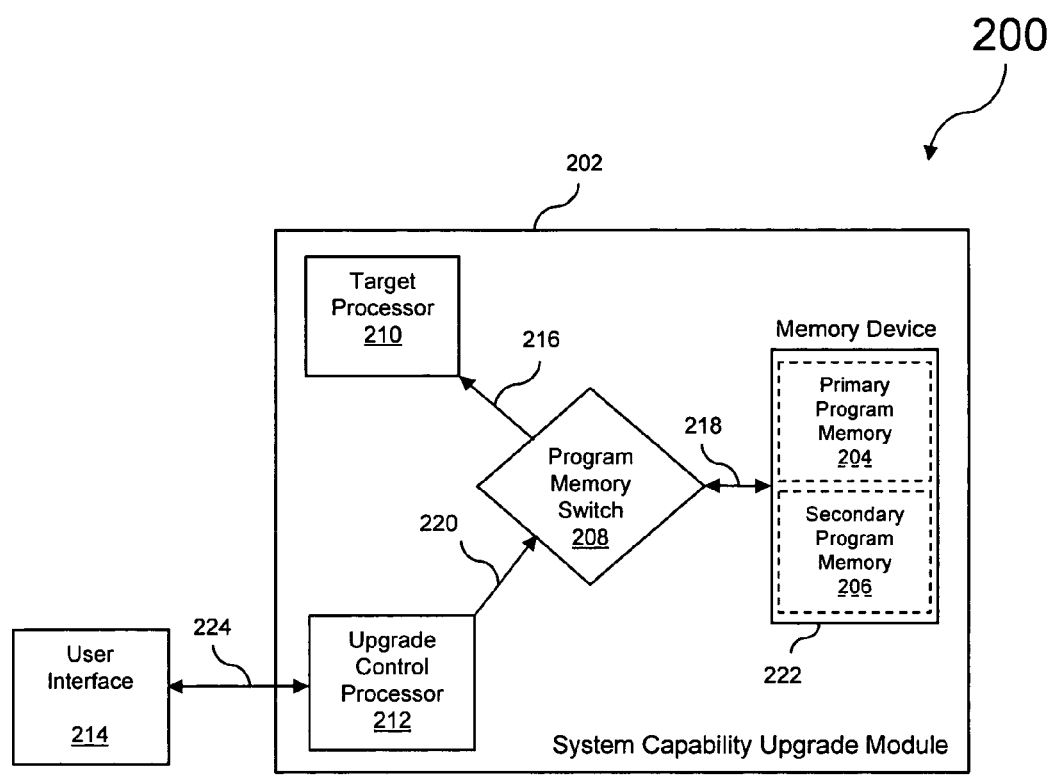
FIG. 2 is a block diagram of one embodiment of a mechanism to upgrade system capability incorporating a system capability upgrade module in accordance with the present invention.

FIG. 2 is a block diagram of an embodiment of a mechanism to upgrade system capability, indicated generally at 200, incorporating a system capability upgrade module according to the teachings of the present invention. Mechanism 200 comprises a system capability upgrade module 202 communicatively coupled to a user interface 214 by a user interface medium 224. In one embodiment, user interface medium 224 is a bi-directional communication link that uses twisted pair cable, optical fiber, coaxial cable, millimeter wave, FSO, or the like to transmit instructions from user interface 214 to system capability upgrade module 202 to initiate a system capability upgrade. In one embodiment, system capability upgrade module 202 includes a target processor 210, program memory switch 208, memory device 222, and upgrade control processor 212, each of which are discussed in turn below.

Target processor 210 is coupled to program memory switch 208 by target program memory transfer interface 216. In one embodiment, target processor 210 is a microprocessor, an FPGA, or the like. In the same embodiment, program memory switch 208 is a programmable logic device, a CPLD, an FPGA, or the like, used to load system software, for target processor 210 from memory device 222. Program memory switch 208 is coupled to memory device 222 by memory transfer interface 218. It is noted that for simplicity in description, a single memory device 222 is shown in FIG. 2. However, it is understood that system capability upgrade module 202 supports any appropriate number of memory devices 222, e.g., 2 or more memory devices. In one embodiment, memory device 222 is a flash memory device, a ROM device, an EEPROM device, an OTP memory device, or any electrical, magnetic, or optical storage device containing at least two memory banks, primary program memory 204 and secondary program memory 206. In the same embodiment, memory transfer interface 218 is a bi-directional communication link used to transfer system software selected by program memory switch 208 from or to either primary program memory 204 or secondary program memory 206 of memory device 222. The decision as to which system software is selected by program memory switch 208 to transfer from memory device 222 to target processor 210 is further described in FIG. 3 below.

Program memory switch 208 is coupled to upgrade controller processor 212 by upgrade instruction interface 220. In one embodiment, upgrade controller processor 212 is a microprocessor, an FPGA, or the like. In the same embodiment, upgrade instruction interface 220 is a direct communication link used to initiate a transfer of system software stored in memory device 222. In one embodiment, both primary program memory 204 and secondary program memory 206 contain the same known good version of system software. In another embodiment, primary program memory 204 contains a current version of system software and secondary program memory 206 contains a core version of system software. Moreover, the core version of system software provides an essential set of system capability software machine-coded instructions that allow system capability upgrade module 202 to continue operating until another system capability upgrade attempt is made. Once upgraded system software is received by update control processor 212, program memory switch 208 transfers the upgraded system software exclusively to primary program memory 204. Since primary program memory 204 is the only storage medium upgraded on a continual basis, secondary program memory 206 is guaranteed to always have a known good version of system software that can be used to operate system capability upgrade module 202 if an upgrade attempt is not successful.

In another embodiment, secondary program memory 206 contains the prior version of system software operating in target processor 210. Moreover, the current version of system software is stored in primary program memory 204. Prior to any system upgrade using system capability upgrade module 202, both primary program memory 204 and secondary program memory 206 contain the same version of system software, and each time primary program memory 204 is upgraded, the prior version of system software is transferred to secondary program memory 206. In yet another embodiment, for each occurrence of a system capability upgrade, program memory switch 208 is instructed to alternate the transfer of a new version of system software between primary program memory 204 and secondary program memory 206. Since each subsequent upgrade process will not affect all of the at least two memory banks of memory device 222 each time, the longevity of the at least two memory banks increases by at least a factor of two.

In operation, system capability upgrade module 202 is already functioning with the previously installed version of system software currently operating on target processor 210. Prior to system capability upgrade module 202 receiving a request to upgrade the system capability, upgrade control processor 212 receives upgraded system software from user interface 214 via user interface medium 224. The upgraded system software is transferred from upgrade control processor 212 to program memory switch 208 via upgrade instruction interface 220. In turn, program memory switch 208 transfers the upgraded system software to primary program memory 204 of memory device 222 via memory transfer interface 218.

Once the upgraded system software is loaded into the primary program memory 204 of memory device 222, upgrade control processor 212 is instructed by user interface 214, as described above, to reinitialize system capability upgrade module 202 by performing a reset. In addition to the reset command issued by upgrade control processor 212, the system capability upgrade will also occur if power is cycled on system capability upgrade module 202, e.g. system capability upgrade module 202 is restarted, anytime after the upgraded set of system software has been transferred into memory device 222. Once the reset or restart occurs, the sequence of upgrading target processor 210 begins, and is further described with respect to FIG. 3 below. By separating the storing of upgraded system software from the actual upgrade operation, the upgrade is performed at any time without interrupting the operation of system capability upgrade module 202 for the entire length of the upgrade process.

Figure 3:
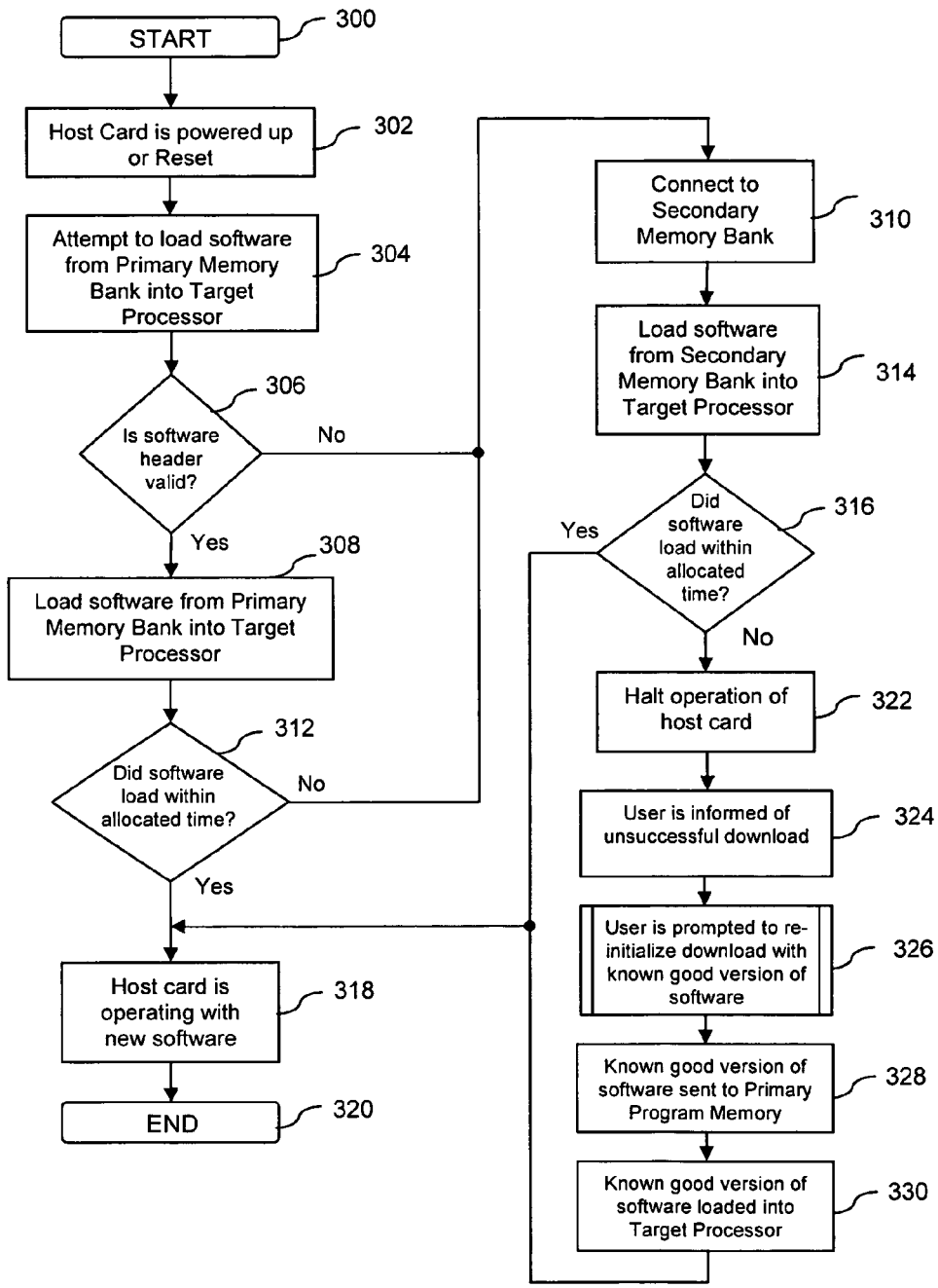
FIG. 3 is a flow diagram illustrating one embodiment of a method to upgrade system capability in a communications network in accordance with the present invention.

FIG. 3 is a flow diagram illustrating an embodiment of a method according to the teachings of the present invention in upgrading system capability in a communications network. The method of FIG. 3 begins at block 300. While the communications network is functioning, system capabilities are enhanced without interrupting the operation of the network for the entire length of the upgrade process. The method of FIG. 3 is designed to upgrade the system capabilities of the communications network without user intervention while the network remains in operation.

At block 302, the method begins when the host card is either powered up or reset, and the method proceeds to block 304. In one embodiment, the host card is mounted inside a SDR server. At block 304, the method attempts to load system software from a primary memory bank into a target processor and the method proceeds to block 306. In one embodiment, the primary bank contained within a non-volatile memory device loads the first frame of system software via a CPLD communicatively coupled to a target microprocessor or an FPGA. At block 306, the method determines whether the header line of the system software loaded in block 304 is valid. In one embodiment, the header line is a configuration header frame that was the final frame in the system software loaded into the primary memory bank, and the first frame to be loaded into the target microprocessor or FPGA at block 304.

When the software header is valid, the method proceeds to block 308. At block 308, the remaining frames of the system software are loaded from the primary memory bank into the target processor, and the method proceeds to block 312. At block 312, the method determines whether the remaining frames of the system software were loaded within an allocated time, e.g., the maximum amount of initialization time allowed by communication interface 126 of FIG. 1. In one embodiment, the allocated time for successfully loading the remaining frames of the system software into the target microprocessor or FPGA is a maximum of 420 ms. Once the entire set of system software is loaded within the allocated time, the method continues to block 318. At block 318, the upgrade process is completed. In one embodiment, the host card begins operating with the upgraded system software. The method described in FIG. 3 ends at block 320.

When the system software is not loaded within the allocated time at block 312, or if it was determined in block 306 that the software header is not valid, the method proceeds to block 310. In one embodiment, if the header frame is not found or is found to be incomplete, e.g., if the final checksum reported by the system software is in error, the CPLD connects the target microprocessor or FPGA to the secondary memory bank. At block 310, a connection is made to the secondary memory bank and the method proceeds to block 314. In one embodiment, the target processor or FPGA is connected to the secondary memory bank within a non-volatile memory device via the CPLD as discussed above. At block 314, a second set of system software is loaded from the secondary memory bank into the target processor, and the method proceeds to block 316. In one embodiment, the second set of system provides enough system capability to continue to operate the system. In another embodiment, the second set of system software provides an equivalent capability to what the system had before the upgrade attempt was made. At block 316, the method determines whether the second set of system software was loaded within an allocated time. In one embodiment, the allocated time for successfully loading the remainder of the second set of system software into the target microprocessor or FPGA is the maximum amount of initialization time allowed by communication interface 126 of FIG. 1. When the second set of system software is loaded within the allocated time, the method continues to block 318. At block 318, the upgrade process is completed. In one embodiment, the host card begins operating with the upgraded system software within the initialization time allocated by communication interface 126 of FIG. 1. The method described in FIG. 3 ends at block 320.

When the second set of system software is not loaded within the allocated time at block 316, operation of the host card is halted at block 322, indicating the upgrade attempt was not completed within the initialization time allocated by the communications network. In one embodiment, when the operation of the host card is halted at block 322, a visual indication is provided to the user indicating that the upgrade was not successful at block 324. At this point, the user is prompted to download a known good version of system software at block 326. Moreover, this known good version of system software is loaded into the primary memory bank at block 328. Once the known good version of system software is loaded in the primary memory bank, the method of FIG. 3 continues at block 330 with the known good version of system software loaded into the target microprocessor or FPGA from the primary program memory. In one embodiment, until the update process is complete, the host card will not provide any service. When the known good version of system software is loaded, the method continues at block 318. At block 318, the upgrade process is completed. In one embodiment, the host card begins operating with the known good version of system software. The method described in FIG. 3 ends at block 320.

Although one or more above embodiments discuss a single set of appropriate system capability software machine-coded instructions (system software), it is understood that the upgrading of one or more sets of system software is accomplished in the same mechanism discussed with respect to these embodiments.

In view of the foregoing, it will be understood by those skilled in the art that the methods of the present invention can be implemented in combination with present communications network technology. Variations and modifications may occur, which fall within the scope of the present invention, as set forth in the following claims.

What is claimed is:

1. A method of upgrading system capability of a communications network, the method comprising:
   initiating a transfer of at least one first set of system capability instructions from a first memory to a target processor;
   determining whether the at least one first set of system capability instructions is valid prior to completing the transfer of the at least one first set of system capability instructions;
   wherein determining whether the at least one first set of system capability instructions is valid comprises determining whether a header line of a first frame transferred from the first memory to the target processor is valid and the first frame transferred from the first memory to the target processor is a frame that was loaded last onto the first memory;
   if the at least one first set of system capability instructions is determined to be valid, completing the transfer of the at least one first set of system capability instructions to the target processor; and
   if the at least one first set of system capability instructions is not valid:
      ceasing the transfer of the at least one first set of system capability instructions from the first memory to the target processor; and
      transferring at least one second set of system capability instructions from a second memory to the target processor.

2. The method of claim 1, further comprising:
   loading the at least one first set of system capability instructions onto the first memory; and
   receiving instructions to perform a reset operation;
   wherein the transfer of the at least one first set of system capability instructions from the first memory to the target processor is initiated upon receipt of the instructions to perform the reset operation.

3. The method of claim 1, further comprising:
   loading the at least one first set of system capability instructions onto the first memory; and
   receiving instructions to perform a power cycle operation;
   wherein the transfer of the at least one first set of system capability instructions from the first memory to the target processor is initiated upon receipt of the instructions to perform the power cycle operation.

4. The method of claim 1, further comprising:
   determining if the transfer of the at least one second set of system capability instructions was completed within a specified time frame that is less than an initialization time of a host card on which the target processor is located; and
   if the transfer of the at least one second set of system capability instructions was not completed within the specified time frame, halting operation of the host card until a known good version of a set of system capability instructions is loaded into the target processor.

5. The method of claim 1, wherein the at least one second set of system capability instructions further comprises a set of instructions providing enough system capability to continue to operate the system.

6. The method of claim 1, wherein the at least one second set of system capability instructions further comprises a set of instructions with an equivalent capability to what the communication network had before initiating the transfer of the at least one first set of system capability instructions to the target processor.

7. A system capability upgrade module, the module comprising:
   at least one primary program memory storage medium adapted to receive one or more first sets of system capability instructions;
   at least one secondary program memory storage medium adapted to receive one or more second sets of system capability instructions;
   a target processor, the target processor adapted to receive the system capability instructions from either the at least one primary or the at least one secondary program memory storage medium; and
   a program memory switch; wherein the program memory switch is configured to:
      initiate a transfer of the one or more first sets of system capability instructions from the at least one primary program memory storage medium to the target processor;
      determine if the one or more first sets of system capability instructions are valid prior to completing the transfer of the at least one or more first sets of system capability instructions to the target processor;
      wherein the program memory switch determines whether the one or more first sets of system capability instructions are valid by determining whether a header line of a first frame transferred from the at least one primary program memory storage medium to the target processor is valid, and the first frame transferred from the at least one primary program memory storage medium to the target processor is a frame that was loaded last onto the at least one primary program memory storage medium;
      complete the transfer of the one or more first sets of system capability instructions if the one or more first sets of system capability instructions are valid; and
      if the one or more first sets of system capability instructions are not valid, the program memory switch is configured to:
      cease the transfer of the one or more first sets of system capability instructions from the at least one primary program memory storage medium; and
      transfer the one or more second sets of system capability instructions from the at least one secondary program memory storage medium to the target processor.

8. The module of claim 7, wherein the at least one primary program memory storage medium comprises one of a flash memory, a read only memory, an electrically erasable programmable read only memory, a one time programmable memory, and other electrical, magnetic or optical memory.

9. The module of claim 7, wherein the at least one secondary program memory storage medium comprises one of a flash memory, a read only memory, an electrically erasable programmable read only memory, a one time programmable memory, and other electrical, magnetic or optical memory.

10. The module of claim 7, wherein the one or more first sets of system capability instructions and the one or more second sets of system capability instructions are identical sets of system capability instructions.

11. The module of claim 7, wherein the one or more first sets of system capability instructions and the one or more second sets of system capability instructions are different sets of system capability instructions.

12. The module of claim 7, wherein the target processor comprises one of a field programmable gate array and a microprocessor.

13. The module of claim 7, wherein the program memory switch comprises one of a programmable logic device, a complex programmable logic device and a field programmable gate array.

14. A communications system, comprising:
- a host card, wherein the host card includes one or more system capability upgrade modules;
- a network card coupled to the one or more system capability upgrade modules over one or more transport mediums; and
- a remote card coupled to the one or more system capability upgrade modules over one or more transport mediums;
- wherein the one or more system capability upgrade modules are instructed by either the network card or the remote card to upgrade system capability;
- wherein each of the one or more system capability upgrade modules comprises:
- a program memory switch;
- at least one primary program memory storage medium adapted to receive one or more first sets of system capability instructions;
- at least one secondary program memory storage medium adapted to receive one or more second sets of system capability instructions; and
- a target processor, the target processor adapted to receive the system capability instructions from either the at least one primary or the at least one secondary program memory storage medium;
- wherein the program memory switch is configured to:
  - initiate a transfer of the one or more first sets of system capability instructions from the at least one primary program memory storage medium to the target processor;
  - determine if the one or more first sets of system capability instructions are valid prior to completing the transfer of the at least one or more first sets of system capability instructions to the target processor;
  - wherein the program memory switch determines whether the one or more first sets of system capability instructions are valid by determining whether a header line of a first frame transferred from the at least one primary program memory storage medium to the target processor is valid, and the first frame transferred from the at least one primary program memory storage medium to the target processor is a frame that was loaded last onto the at least one primary program memory storage medium;
  - complete the transfer of the one or more first sets of system capability instructions if the one or more first sets of system capability instructions are valid; and
  - if the one or more first sets of system capability instructions are not valid, the program memory switch is configured to:
  - cease the transfer of the one or more first sets of system capability instructions from the at least one primary program memory storage medium; and transfer the one or more second sets of system capability instructions from the at least one secondary program memory storage medium to the target processor.

15. The system of claim 14, wherein the host card further comprises:
- one or more connectors, wherein the one or more connectors communicate with the system capability upgrade module over one or more interface mediums.

16. The system of claim 15, wherein the one or more interface mediums includes at least one of a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a CardBus interface, a high speed serial interface and a high speed parallel interface.

17. The system of claim 14, wherein the one or more transport mediums are one or more of twisted pair cable, optical fiber, millimeter wave, coaxial cable, and free space optics.

18. The system of claim 14, wherein the at least one primary program memory storage medium comprises one of a flash memory, a read only memory, an electrically erasable programmable read only memory, a one time programmable memory, and other electrical, magnetic or optical memory.

19. The system of claim 14, wherein the at least one secondary program memory storage medium comprises one of a flash memory, a read only memory, an electrically erasable programmable read only memory, a one time programmable memory, and other electrical, magnetic or optical memory.

20. The system of claim 14, wherein the target processor comprises one of a field programmable gate array and a microprocessor.

21. The system of claim 14, wherein the one or more first sets of system capability instructions and the one or more second sets of system capability instructions are identical sets of system capability instructions.

22. The module of claim 14, wherein the one or more first sets of system capability instructions and the one or more second sets of system capability instructions are different sets of software machine-coded instructions.

23. The system of claim 14, wherein the program memory switch comprises one of a programmable logic device, a complex programmable logic device and a field programmable gate array.

24. An apparatus for upgrading the system capability of a communications network, the apparatus comprising:
- means for initiating a transfer of at least one first set of system capability instructions from a first memory to a target processor;
- means for determining whether a header line of a first frame of the at least one first set of system capability instructions transferred from the first memory to the target processor is valid prior to completing the transfer of the at least one first set of system capability instructions, wherein the first frame transferred from the first memory to the target processor is a frame that was loaded last onto the first memory;
- means for completing the transfer of the at least one first set of system capability instructions to the target processor if the at least one first set of system capability instructions is determined to be valid; and
- if the at least one first set of system capability instructions is not valid:
  - means for ceasing the transfer of the at least one first set of system capability instructions from the first memory to the target processor; and
  - means for transferring at least one second set of system capability instructions from a second memory to the target processor.

25. The apparatus of claim 24, further comprising:
- means for loading the at least one first set of system capability instructions onto the first memory; and
- means for receiving instructions to perform a reset operation;
- wherein the transfer of the at least one first set of system capability instructions from the first memory to the target processor is initiated upon receipt of the instructions to perform the reset operation.

26. The apparatus of claim 24, further comprising:

means for loading the at least one first set of system capability instructions onto the first memory; and means for receiving instructions to perform a power cycle operation;

wherein the transfer of the at least one first set of system capability instructions from the first memory to the target processor is initiated upon receipt of the instructions to perform the power cycle operation.

27. The apparatus of claim 24, further comprising:

means for determining if the transfer of the at least one second set of system capability instructions was completed within a specified time frame that is less than an initialization time of a host card on which the target processor is located; and means for halting operation of the host card until a known good version of a set of system capability instructions is loaded into the target processor if the transfer of the at least one second set of system capability instructions was not completed within the specified time frame.

28. The apparatus of claim 24, wherein the at least one second set of system capability instructions further comprises a set of instructions providing enough system capability to continue to operate the system.

29. The apparatus of claim 24, wherein the at least one second set of system capability instructions further comprises a set of instructions with an equivalent capability to what the communication network had before initiating the transfer of the at least one first set of system capability instructions to the target processor.

* * * * *